(12) United States Patent
Chabane et al.

(10) Patent No.: US 11,527,803 B2
(45) Date of Patent: Dec. 13, 2022

(54) ELECTRICALLY AND THERMALLY CONNECTING DEVICE FOR BATTERIES AND PIECES OF ELECTRICAL DISTRIBUTION EQUIPMENT OF AN AIRCRAFT

(71) Applicant: ZODIAC AERO ELECTRIC, Montreuil (FR)

(72) Inventors: Katib Chabane, Montreuil (FR); Julien Giron, Montreuil (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 779 days.

(21) Appl. No.: 16/469,527

(22) PCT Filed: Dec. 14, 2017

(86) PCT No.: PCT/FR2017/053587
§ 371 (c)(1),
(2) Date: Jun. 13, 2019

(87) PCT Pub. No.: WO2018/109408
PCT Pub. Date: Jun. 21, 2018

(65) Prior Publication Data
US 2020/0006738 A1 Jan. 2, 2020

(30) Foreign Application Priority Data

Dec. 15, 2016 (FR) ........................................ 1601790
Jun. 13, 2017 (FR) ........................................ 1755300

(51) Int. Cl.
*H01M 10/625* (2014.01)
*H01M 50/502* (2021.01)
(Continued)

(52) U.S. Cl.
CPC ....... *H01M 50/502* (2021.01); *H01M 10/625* (2015.04); *H01M 10/6553* (2015.04); *H01R 11/288* (2013.01); *B64D 2221/00* (2013.01)

(58) Field of Classification Search
CPC ............ B64D 2221/00; H01M 10/625; H01M 10/6553; H01M 50/502; H01R 11/288; Y02E 60/10
See application file for complete search history.

(56) References Cited

U.S. PATENT DOCUMENTS 6,773,301 B1 8/2004 Chaskin
2012/0034499 A1 2/2012 Meehan
(Continued)

OTHER PUBLICATIONS

International Search Report dated Apr. 12, 2018, issued in corresponding International Application No. PCT/FR2017/053587, filed Dec. 14, 2017, 4 pages.

*Primary Examiner* — Victoria H Lynch
(74) *Attorney, Agent, or Firm* — Christensen O'Connor Johnson Kindness PLLC

(57) ABSTRACT

The invention relates to an electrically and thermally connecting device (3) for batteries and pieces of electrical distribution equipment of an aircraft, comprising a casing (5) containing a plurality of bare under-voltage parts (7), said connecting device (3) being intended to make contact with a portion of the casing (5) and at least one bare under-voltage part (7), said connecting device (3) furthermore comprising: at least one base (11) that is made from a thermally conductive material and that is intended to be fastened to the portion of the casing (5); at least one head (13) that comprises a springback connector and that is intended to make contact with the bare under-voltage parts (7) and the portion of the casing (5); and an intermediate element (15) that is intended to electrically connect the bare parts (7), said element (15) being clamped between a base (Continued)

(11) and a head (13). The invention also relates to a battery and to a piece of electrical distribution equipment for an aircraft.

12 Claims, 2 Drawing Sheets

(51) Int. Cl.
*H01M 10/6553* (2014.01)
*H01R 11/28* (2006.01)

(56) References Cited

U.S. PATENT DOCUMENTS

| 2013/0157102 | A1  | 6/2013 | Nagamatsu et al. |            |
|--------------|-----|--------|------------------|------------|
| 2017/0264107 | A1* | 9/2017 | Cheon            | H02J 7/0068 |
| 2018/0114985 | A1* | 4/2018 | Volkov           | H01M 4/131  |

* cited by examiner

ELECTRICALLY AND THERMALLY CONNECTING DEVICE FOR BATTERIES AND PIECES OF ELECTRICAL DISTRIBUTION EQUIPMENT OF AN AIRCRAFT

The invention relates to an electrically and thermally connecting device for batteries and pieces of electrical distribution equipment of an aircraft, as well as to a battery comprising a connecting device of this type.

An electrical power connection is formed by mechanical securing, in particular by means of screws, or by pressure with spring strips. A thermal connection is produced by means of conductive materials, and with good control of the contact surfaces. The quality of these two connections is important for the operation of any piece of electrical equipment. These two connections also pose dielectric problems.

The battery is generally enclosed in a confinement enclosure or casing, which thus makes it possible to confine the gases in the event of failure. The thermal exchange then becomes very complex, since it can be carried out only by direct conduction.

The pieces of electrical equipment have modules with limited accessibility which need to be racked, slid and deposited in very confined environments.

In addition, in the case of stacking of a plurality of parts, the chain of dimensions does not make it possible to guarantee electrical and thermal contacts which are both good. Within a battery, the accessibility of the mechanical fastenings is limited because of the presence of a sealed enclosure.

Finally, the risks associated with short-circuiting during assembly of the sub-assembly are substantial, in particular for high-voltage batteries. In fact, when putting into series the different modules which constitute the battery, the technician who is responsible for the assembly incurs very high risks in the event of an accident, such as electric shocks, electrocution, flash giving rise to a loss of sight, and burns.

There is a need to provide an electrically and thermally connecting device for batteries and pieces of electrical distribution equipment of an aircraft which does not have the aforementioned disadvantages, and is reliable and efficient.

According to a first aspect, the invention relates to an electrically and thermally connecting device for batteries and pieces of electrical distribution equipment of an aircraft comprising a casing containing a plurality of live bare parts, said connecting device being designed to be in contact with a part of the casing and at least one live bare part, said connecting device also comprising:
- at least one base which is made of a thermally conductive material, and is designed to be secured on the part of the casing;
- at least one head which comprises a resilient return connector, and is designed to put the live bare parts and the part of the casing into contact;
- an intermediate element which is designed to connect the live bare parts electrically, said element being clamped between a base and a head.

"Live bare part" means a part which is made of an electrically conductive material which conveys an electrical charge without electrically insulating protection on the visible area of the part.

According to particular embodiments of the invention, the electrically and thermally connecting device can comprise one or a plurality of the following characteristics, taken in isolation, or according to any possible combinations:
- the base is made of a ceramic material;
- the head comprises a connector comprising one or more spring strips;
- the connector comprises a support on which the strip(s) is/are secured, the support being made of aluminum or of copper;
- the base is a wedge disposed between the intermediate element and the part of the casing;
- the base covers the securing means of the connector;
- the intermediate element is a substantially flat bar made of an electrically conductive material, in particular aluminum or copper;
- the intermediate element comprises a central part which is glued onto the part of the casing by means of a dielectric insulating film, and at least one end which is clamped between the head and the base.

According to another aspect, the invention also relates to a piece of electrical distribution equipment for an aircraft comprising a casing, at least one electrical power component, and live bare parts, and a connecting device according to the invention.

Advantageously, the casing comprises a cover which is mobile relative to a body containing the live bare parts, the connecting device ensuring the electrical and thermal connection of each electronic contact and of the cover.

According to yet another aspect, the invention relates to an aircraft battery comprising a casing and at least two cells contained in said casing, said battery comprising at least two connecting devices according to the invention.

Advantageously, the casing comprises a cover which is mobile relative to a body containing the at least two cells, the connecting device ensuring the electrical and thermal connection of each cell and of the cover.

Thanks to the invention, bulky mechanical fastenings are eliminated, thus making it possible to put the cells of the battery into series electrically in complete safety, or to put a module in place in a piece of electrical distribution equipment. In fact, the risks associated with short-circuiting, which are present in particular during the installation and assembly of the battery, are eliminated because of the automatic connection of the cells and of the casing or of the bus bar with its terminal, by the connecting device, during the closure of the casing.

The connecting device thus makes it possible to reduce the volume required for the electrical and thermal functions, thus giving rise to a saving in weight, whilst recuperating the heat as close as possible to the source.

A duplicate dedicated thermal solution for the electrical connectors is eliminated. Since the mechanical fastenings are limited, the equipment will comprise fewer parts, and therefore there will be a saving in weight.

Thus, the invention permits optimization of the volume, and of the number of parts, and safety during assembly, in particular for the battery, as well as simplification of the structure.

The assembly of the battery is made safer since all the internal actions after putting the cells into series are eliminated.

The invention also makes it possible to ensure the thermal-electrical transfer in a compact, confined volume, with a connection of live bare parts not on view.

Other objectives, characteristics and advantages of the invention will become apparent from reading the following description, provided purely by way of non-limiting example, and with reference to the appended drawings in which.

Figure 1:
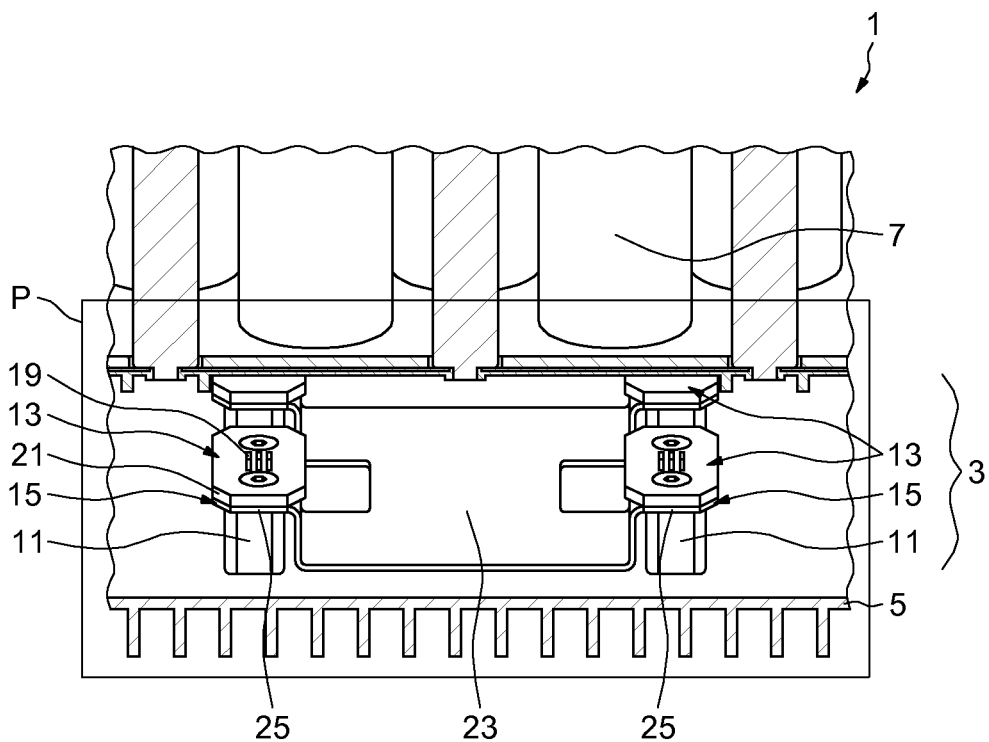
FIG. 1 is a side view in perspective of an embodiment of a connecting device according to the invention.
Figure 2:
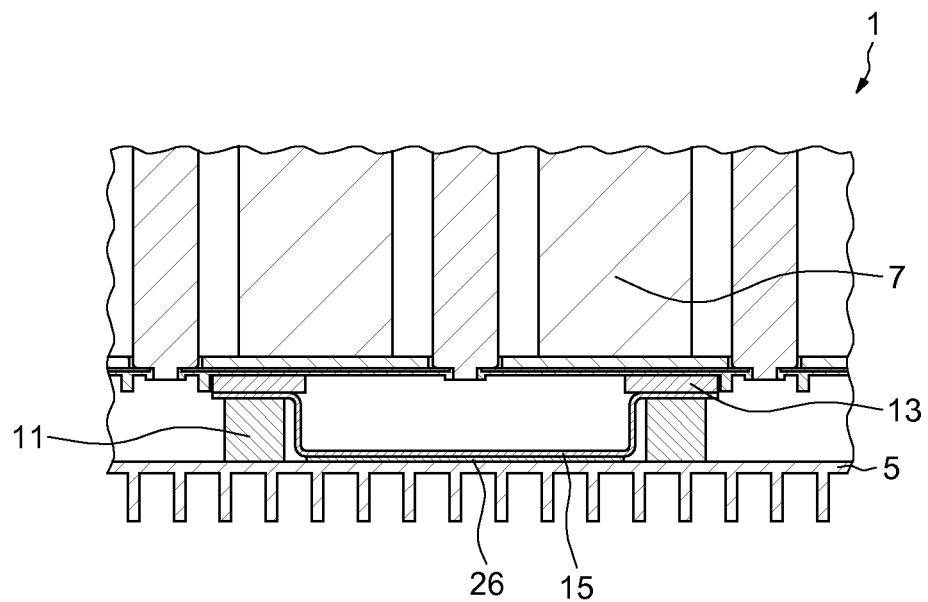
FIG. 2 is a view in cross-section of FIG. 1 according to a plane (P)

According to the embodiment represented in FIG. 1 partially in cross-section, the battery 1 according to the invention is configured to be installed and used in an aircraft (not represented).

The battery 1 according to the invention comprises a casing 5 containing a plurality of bare parts, in this case in the form of cells 7.

The casing 5 is an enclosure which is sealed against gases and fluid, and is designed to contain a plurality of battery cells 7.

The casing can comprise a cover and a body. The cover is fitted such as to be mobile relative to said body, and can be added onto the body by any means.

The body delimits a space which can receive all of the cells of the battery.

The cells 7 can be flexible bags, or they can be in the form of a cylinder.

The battery 1 according to the invention also comprises an electrically and thermally connecting device 3 which is designed to be in contact with a part of the casing 5 and at least one cell 7. The connecting device 3 according to the invention ensures the electrical and thermal connection of each cell 7 and of the casing 5, in particular of the cover.

The device 3 according to the invention also comprises:
- at least one base 11 made of material which conducts heat but is electrically insulating, and is designed to be secured on the part of the casing 5, in particular the cover, or on the cell of the battery 7;
- at least one head 13 which comprises a resilient return connector, and is designed to put into contact respectively the cell 7 of the battery and the part of the casing 5, in particular the cover;
- an intermediate element 15 which is designed to connect the cells 7 electrically, and in particular to put the cells 7 into series, said element 15 being clamped between a base 11 and a head 13.

The base 11 can be made of a ceramic material. The base can be glued on the part of the casing 5 or on the cell of the battery 7 by means of a dielectric insulating film 26, as represented here. By way of example of a dielectric insulating film, reference can be made to ethylene polyterephthalate, also known as Mylar™, or to a polyimide film, for example Kapton™.

When the base 11 is in contact with a part of the casing 5, such as the cover, the head 13 is in contact with the battery 7.

Similarly, when the base 11 is in contact with the battery 7, the head 13 is in contact with a part of the casing 5, such as the cover. In other words, the base 11 and the head 13 are in contact with elements of a different nature.

The head 13 can advantageously comprise a connector comprising one or more spring strips 19 which make it possible both to ensure the electrical contact and to eliminate any dimensional play.

The connector can comprise a support 21 on which the strip(s) 19 is/are secured, said support 21 being made of aluminum or of copper.

The spring strip(s) 19 can be secured on the casing, in particular the cover, by one or a plurality of screws.

The base 11 can then be a ceramic wedge disposed between the intermediate element 15 and the cover 5, covering the securing means of the connector.

The intermediate element 15 can be a substantially flat bar, and made of an electrically conductive material, in particular aluminum or copper.

The intermediate element 15 can comprise a central part 23 glued onto the part of the casing 5, in particular the cover, by means of a dielectric insulating film and at least one end 25 clamped between a head 13 and a base 11. The coupling, adhesion and strips make it possible to compensate for the problems associated with the chains of dimensions, whilst guaranteeing good electrical and thermal contact.

Figure 3:
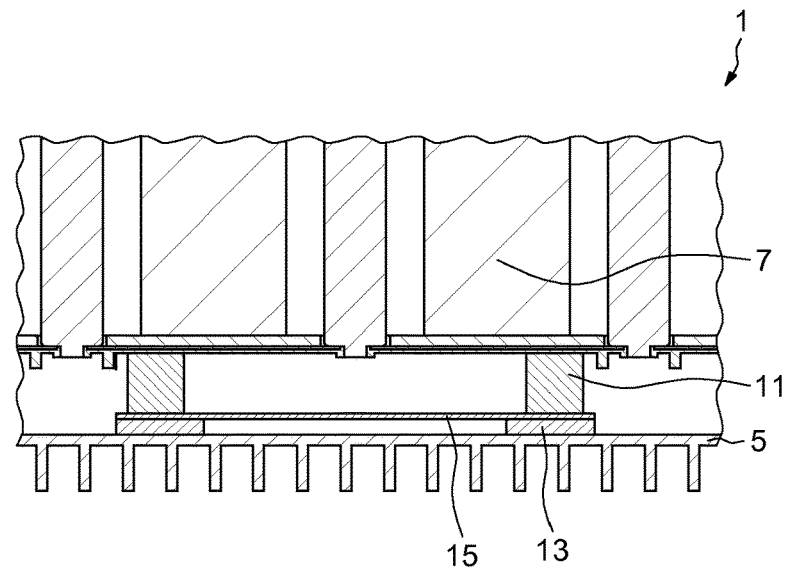
FIG. 3 shows a second embodiment of a connecting device according to the invention.

FIG. 3 illustrates a second embodiment of the invention, in which the base 11 is in contact with the battery 7, and the head 13 is in contact with a part of the casing 5, such as the cover.

Figure 4:
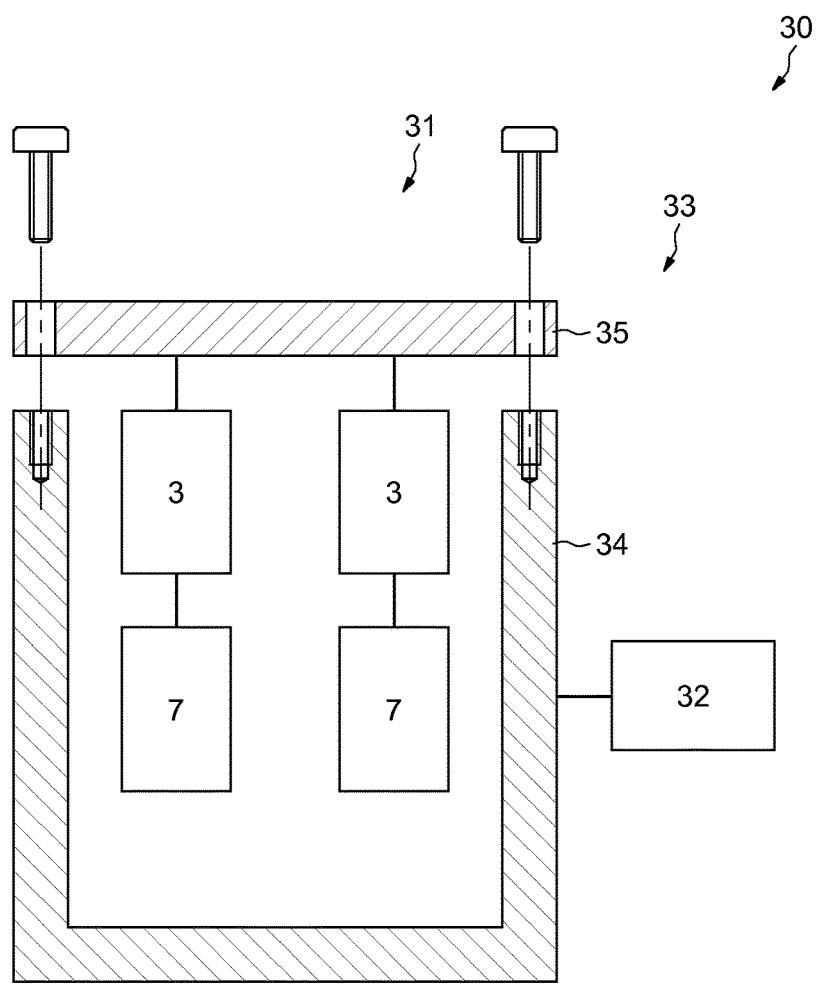
FIG. 4 shows an example of electrical distribution equipment for an aircraft.

Reference is made to FIG. 4, which illustrates a piece of electrical distribution equipment 30 configured for example for an aircraft.

The electrical distribution equipment 30 comprises a battery 31 connected to an electrical power component 32.

The battery 31 comprises a casing 33 comprising a body 34 and a cover 35 which is mobile relative to the body 34.

The cover 35 is secured on the body 34, for example by screwing, as represented here, or by snapping in.

The body 34 comprises a plurality of live bare parts 7 and two connecting devices 3 ensuring the electrical and thermal connection of each bare part 7 and of the cover 35.

Although the cover 35 is in this case mobile relative to the body 34, the connecting devices 3 also ensure the electrical and thermal connection of each bare part 7 and of a cover which is integral with the body 34.

Thus, and advantageously, when the user closes the cover on the body of the casing containing the cells of the battery, the electrical and thermal connection is formed reliably and efficiently, without the user needing to see the connection.

This operating principle can be transposed directly to a module which would be inserted in a piece of electrical distribution equipment.

The invention claimed is:

1. An electrically and thermally connecting device for batteries and pieces of electrical distribution equipment of an aircraft comprising a casing containing a plurality of parts made of an electrically conductive material which conveys an electrical charge without electrically insulating protection on a visible area of live parts, said connecting device being designed to be in contact with a part of the casing and at least one live part, said connecting device comprising:
   at least one base which is made of a thermally conductive material, and is designed to be secured on the part of the casing or is designed to be secured on the at least one live part;
   at least one head which comprises a resilient return connector, and is designed to put the live parts and the part of the casing into contact;
   an intermediate element which is designed to connect the live parts electrically, said element being clamped between the base and the head, the base and the head being in contact with elements of a different nature,
   wherein the resilient return connector comprising one or more spring strips.

2. The device as claimed in claim 1, wherein the base is made of a ceramic material.

3. The device as claimed in claim 1, wherein the resilient return connector comprises a support on which the strip(s) is/are secured, said support being made of aluminum or of copper.

4. The device as claimed in claim 1, wherein the base is a wedge disposed between the intermediate element and the part of the casing.

5. The device as claimed in claim 1, wherein the base covers a securing means of the resilient return connector.

6. The device as claimed in claim 1, wherein the intermediate element is a substantially flat bar made of an electrically conductive material.

7. The device as claimed in claim 6, wherein the electrically conductive material includes aluminum or copper.

8. The device as claimed in claim 1, wherein the intermediate element comprises a central part which is glued onto the part of the casing by means of a dielectric insulating film, and at least one end which is clamped between the head and the base.

9. A piece of electrical distribution equipment for an aircraft comprising a casing, at least one electrical power component, and live parts, and a connecting device which ensures the electrical and thermal connection as claimed in claim 1.

10. The piece of electrical distribution equipment as claimed in claim 9, wherein the casing comprises a cover which is mobile relative to a body containing the live parts, the connecting device ensuring the electrical and thermal connection of each electronic contact and of the cover.

11. An aircraft battery comprising a casing and at least two cells contained in said casing, said battery comprising at least two connecting devices as claimed in claim 1.

12. The aircraft battery as claimed in claim 11, wherein the casing comprises a cover which is mobile relative to a body containing the at least two cells, the connecting device ensuring the electrical and thermal connection of each cell and of the cover.

* * * * *